US008635061B2

(12) United States Patent
Li et al.

(10) Patent No.: US 8,635,061 B2
(45) Date of Patent: Jan. 21, 2014

(54) LANGUAGE IDENTIFICATION IN MULTILINGUAL TEXT

(75) Inventors: Kang Li, Sammamish, WA (US); Stephen Allen Kloder, Seattle, WA (US); Ian George Johnson, Sammamish, WA (US); Siarhei Alonichau, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 168 days.

(21) Appl. No.: 12/904,642

(22) Filed: Oct. 14, 2010

(65) Prior Publication Data

US 2012/0095748 A1    Apr. 19, 2012

(51) Int. Cl.
G06F 17/20 (2006.01)
G06F 17/27 (2006.01)
G10L 15/00 (2013.01)

(52) U.S. Cl.
USPC ............... 704/8; 704/9; 704/10; 704/257

(58) Field of Classification Search
USPC ................................................ 704/1–9
See application file for complete search history.

(56) References Cited

U.S. PATENT DOCUMENTS

| 6,006,221 | A  | * | 12/1999 | Liddy et al. ................. 1/1 |
| 6,047,251 | A  | * | 4/2000  | Pon et al. ................. 704/1 |
| 6,167,369 | A  | * | 12/2000 | Schulze ................. 704/9 |
| 7,139,697 | B2 | * | 11/2006 | Hakkinen et al. ............ 704/9 |
| 7,359,851 | B2 | * | 4/2008  | Tong et al. ................. 704/8 |
| 7,386,438 | B1 |   | 6/2008  | Franz |
| 7,729,899 | B2 | * | 6/2010  | Otsuka ................. 704/2 |
| 7,865,355 | B2 | * | 1/2011  | Xu et al. ................. 704/8 |
| 8,027,832 | B2 | * | 9/2011  | Ramsey et al. ........... 704/9 |
| 8,161,041 | B1 | * | 4/2012  | Grushetskyy et al. ...... 707/727 |
| 2005/0246410 | A1 |   | 11/2005 | Chen |
| 2006/0025988 | A1 | * | 2/2006  | Xu et al. ................. 704/8 |
| 2006/0184357 | A1 |   | 8/2006  | Ramsey |
| 2008/0120317 | A1 | * | 5/2008  | Gile et al. ................ 707/101 |
| 2008/0243477 | A1 |   | 10/2008 | Bush |
| 2008/0281577 | A1 | * | 11/2008 | Suzuki .................. 704/2 |
| 2009/0182547 | A1 | * | 7/2009  | Niu et al. ............... 704/2 |
| 2009/0198487 | A1 |   | 8/2009  | Wong et al. |
| 2010/0125447 | A1 | * | 5/2010  | Goswami .............. 704/8 |

(Continued)

OTHER PUBLICATIONS

Approaches to Language Identification using Gaussian Mixture Models and Shifted Delta Cepstral Features—Published Date: 2002 http://citeseerx.ist.psu.edu/viewdoc/download?doi=10.1.1.112.4442&rep=rep1&type=pdf.

(Continued)

Primary Examiner — David R Hudspeth
Assistant Examiner — Timothy Nguyen
(74) Attorney, Agent, or Firm — Shook, Hardy & Bacon L.L.P.

(57) ABSTRACT

Methods, systems, and media are provided for identifying languages in multilingual text. A document is decoded into a universal representative coding for easier tag manipulation, then broken into plain-text content sections. The sections are identified and assigned a weight, wherein more informative sections are given a higher weight and less informative sections are given a lesser weight. A language likelihood score is determined for each word, phrase, or character n-gram in a section. The language likelihood scores within a section are combined for each language. The combined section scores are then summed together to obtain a total document score for each language. This results in a document score for each language, which can be ranked to determine the primary language for the document.

18 Claims, 9 Drawing Sheets

(56) References Cited

U.S. PATENT DOCUMENTS

| | | |
|---|---|---|
| 2010/0138211 A1 | 6/2010 | Shi et al. |
| 2010/0228549 A1* | 9/2010 | Herman et al. ............... 704/260 |
| 2010/0312545 A1* | 12/2010 | Sites ................................ 704/8 |
| 2012/0035912 A1* | 2/2012 | Litvak et al. ..................... 704/8 |

OTHER PUBLICATIONS

Spam Filtering—Published Date: 2004 http://www.ling.ohio-state.edu/~dickinso/384/wi04/slides/spam-slides-4up.pdf.

Automatic Language Identification—Published Date:1996 http://cslu.cse.ogi.edu/HLTsurvey/ch8node9.html.

Unicode Compliant Multilingual Word Breaker—Published Date: 2005 http://www.codeproject.com/KB/cs/breaker.aspx.

Rosette Language Identifier—Published Date: 2010 http://www.basistech.com/language-identification/.

Rosette Language Analyzer—Published Date: 2010.

Bing Language Identification Next Generation, Power Point Presentation, Li, Kang, 2010.

International Search Report with Written Opinion mailed Apr. 27, 2012, in PCT/US2011/052133, 9 pages.

* cited by examiner

| Type | Weight |
|---|---|
| Title | 10 |
| Option (in a selection list or drop down menu) | 0 |
| Code | 0 |
| Header - Navigation Links | 1 |
| Header - Other Text | 5 |
| Left side bar - Navigation Links | 1 |
| Left side bar - Other Text | 2 |
| Right side bar - Navigation Links | 1 |
| Right side bar - Other Text | 2 |
| Main Block - Author | 1 |
| Main Block - Date/Time | 1 |
| Main Block - Heading | 8 |
| Main Block - Article Text | 5 |
| Main Block - User Comments | 3 |
| Main Block - Navigation Links | 4 |
| Main Block - Other Text | 2 |
| Footer - Copyright/Legal Notice | 1 |
| Footer - Other Text | 1 |

*FIG. 3*

Sitio Web Español

Español | English | 简体中文

Título español

EFE / MADRID
Día 13/08/2010 – 12.25H

Artículo español español español español español español
español español español español español español El apartado español español español español español
español español español español español español Más de texto español español español español español

5 comentarios

Александр
*Это огромная ! Это огромная ! Это огромная ! Это*
Enlace permanente | 24.03.04 / 13:31:31

Chang
我顶顶顶顶顶顶顶顶！太有创意了！太犀利了。我什么都不说了！太可不知是谁做的呢？太有才了！有机会学习交流下。
Enlace permanente | 24.03.04 / 13:21:23

瀬戸康史
子犬を食べるエビチップ！だからかわいい！
Enlace permanente | 24.03.04 / 12:45:16

Daniel
Esto es impresionante! Esto es impresionante! Esto es impresionante! Esto es impresionante! Esto es impresionante! Ha de ser super!
Enlace permanente | 24.03.04 / 11:32:11

Jack
This is awesome! I was looking for this for ages :D!
Enlace permanente | 24.03.04 / 10:12:54

LINK1
LINK2
LINK3
LINK4

LINK5
LINK6
LINK7
LINK8

Copyright © ABCD Corporation

*FIG. 4*

| Sections | Classes | Weight |
|---|---|---|
| Sitio Web Español | Header, Latin | 8 |
| Español \| English \| | Header, Navigation, Latin | 1 |
| 简体中文 | Header, Navigation, Han | 1 |
| Link 1 | Left Side Bar, Navigation, Latin | 1 |
| Link 2 | Left Side Bar, Navigation, Latin | 1 |
| Link 3 | Left Side Bar, Navigation, Latin | 1 |
| Link 4 | Left Side Bar, Navigation, Latin | 1 |
| Título españo | Main Block, Heading, Latin | 8 |
| IEFE / MADRID | Main Block, Author, Latin | 3 |
| Día 13/08/2010 - 12.25h | Main Block, Date, Latin | 3 |
| Artículo español ... | Main Block, Information, Latin | 5 |
| El apartado español ... | Main Block, Information, Latin | 5 |
| Más de texto español ... | Main Block, Information, Latin | 5 |
| 5 comentarios | Main Block, Comments, Latin | 1 |
| Это огромная! Это огромная! | Main Block, Comments, Cyrillic | 1 |
| Enlace permanente \| 24.03.04 / 13:31:31 | Main Block, Comments, Cyrillic | 1 |
| Chang | Main Block, Comments, Latin | 1 |
| 我顶顶顶顶顶顶顶顶顶！... | Main Block, Comments, Latin | 1 |
| Enlace permanente \| 24.03.04 / 13:21:23 | Main Block, Comments, Han | 1 |
| 瀬戸康史 | Main Block, Comments, Latin | 1 |
| 子犬 | Main Block, Comments, Han | 1 |
| を | Main Block, Comments, Han | 1 |
| 食 | Main Block, Comments, Hiragana | 1 |
| べる | Main Block, Comments, Han | 1 |
| エビチップ！だからかわ | Main Block, Comments, Hiragana | 1 |
| いい！ | Main Block, Comments, Katakana | 1 |
| Enlace permanente \| 24.03.04 / 12:45:16 | Main Block, Comments, Hiragana | 1 |
| Daniel | Main Block, Comments, Latin | 1 |
| Esto es impresionante!... | Main Block, Comments, Latin | 1 |
| Enlace permanente \| 24.03.04 / 11:32:11 | Main Block, Comments, Latin | 1 |
| Jack | Main Block, Comments, Latin | 1 |
| This is awesome! I was looking for this for... | Main Block, Comments, Latin | 1 |
| Enlace permanente \| 24.03.04 / 10:12:54 | Main Block, Comments, Latin | 1 |
| Link 5 | Right Side Bar, Navigation, Latin | 1 |
| Link 6 | Right Side Bar, Navigation, Latin | 1 |
| Link 7 | Right Side Bar, Navigation, Latin | 1 |
| Link 8 | Right Side Bar, Navigation, Latin | 1 |
| Copyright © ABCD Corporation. | Footer, Copyright, Latin | 1 |

*FIG. 5*

$$L_1 \qquad L_2 \qquad L_m$$

$$\sum_k S_{1k}W_1 \qquad \sum_k S_{2k}W_1 \qquad \sum_k S_{mk}W_1$$
$$+ \qquad + \qquad +$$
$$\sum_k S_{1k}W_2 \qquad \sum_k S_{2k}W_2 \qquad \sum_k S_{mk}W_2$$
$$\vdots \qquad \vdots \qquad \cdots \qquad \vdots$$
$$+ \qquad + \qquad +$$
$$\underline{\sum_k S_{1k}W_n} \qquad \underline{\sum_k S_{2k}W_n} \qquad \underline{\sum_k S_{mk}W_n}$$
$$D_1 = \sum_k S_{1k}W_{1 \to n} \qquad D_2 = \sum_k S_{2k}W_{1 \to n} \qquad D_m = \sum_k S_{mk}W_{1 \to n}$$

WHERE:

$L_j$ = language$_j$
$S_{jk}$ = score of word having language$_j$
$W_i$ = weight of section$_i$
$W_{1 \to n}$ = section weight 1 through n
$\sum S_{jk}W_i$ = section$_i$ score
$D_j$ = document score for language$_j$
Rank $D_1$ through $D_m$

*FIG. 6*

Notations:

M: Total number of languages $M_k$: Number of languages that word k corresponds to $p_j$: The prior probability of language j, which can be estimated as the ratio of documents written in language j in the training corpus.

Steps:

1. Count the number of occurrences ($C_{j,k}$) of word k in the corpus of language j, for all j, k.
2. Select a cut-off count $C_{j,cutoff}$ for language j. Retain words with $C_{j,k} >= C_{j,cutoff}$; discard other words. The number of remaining words for language j is denoted $N_j$.
3. Compute the likelihood of word k in language j as: $l_{j,k} = C_{j,k} / N_j$.
4. Compute the transformed likelihood score of word k in language j: $L_{j,k} = \log(l_{j,k} * M_k / M)$
5. Compute the transformed prior score of language j as: $P_j = \log(p_j)$
6. Record the minimum and maximum values of the transformed scores in Steps 4 and 5, denoted $S_{min}$ and $S_{max}$, respectively.
7. Scale the transformed scores using:

$S_{j,k} = (L_{j,k} - S_{min}) * 254 / (S_{max} - S_{min}) + 1$ $S_j = (P_j - S_{min}) * 254 / (S_{max} - S_{min}) + 1$ The document score for language j is computed as:

$$D_j = \sum_i w_i \sum_{k \in Section_i} S_{j,k} + S_j$$

where $w_i$ is the weight of $section_i$.

*FIG. 7*

LANGUAGE IDENTIFICATION IN MULTILINGUAL TEXT

BACKGROUND

It is often useful or necessary to determine which of several languages present in a document (e.g., a web page) is the primary language. Such documents are referred to as multilingual. This determination helps identify the relevance of a web page to a particular query. The task of an automatic language detection system is to identify the primary language (and additional languages, if present) of which a document is composed. A search engine uses the language composition of a document as one factor to determine how relevant the document is to a query. Some existing systems are designed to output a list of languages ranked by confidence in addition to the primary language, but they may not be able to specify which of the languages are actually present in a document.

These limitations lower the effectiveness of language detection for multilingual documents, because they may cause incorrect word-breaking. A word-breaker identifies individual words for a given language by determining where word boundaries exist based on the linguistic rules of the language. Language-specific word-breakers enable the resulting terms to be more accurate for that language. In a multi-lingual document, the primary language is determined, then a word-breaker for the primary language is usually applied to the entire document. This results in improperly word-breaking substantial non-primary language portions of the document.

All portions of a document are conventionally treated equally in determining the primary language of a document, which causes other limitations. However, in reality, certain portions of a document are more important or more informative than other portions of a document. As an example, a copyright statement is generally less informative to the document as a whole than the title. Giving the same weight to these different parts of the document could result in improperly assigning the primary language, particularly in shorter texts.

SUMMARY

Embodiments of the invention are defined by the claims below. A high-level overview of various embodiments is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

Systems, methods, and computer-readable storage media are described for identifying language in multilingual text. These are used to decode a document into a universal representative coding for easier tag manipulation, and to break the plain-text content into sections. The sections are identified and assigned a weight, wherein more informative sections are given a higher weight and less informative sections are given a lesser weight. In addition, the language of each section is determined so that different word breakers can be utilized to tokenize text written in different languages.

Breaking a document into sections and classifying the sections into different types can better determine the primary language of a document. This is implemented by utilizing a language likelihood score for each word, phrase, or character n-gram in a section. An n-gram is defined herein as an arbitrary short sequence of characters, such as 1-5 characters. A single word may comprise multiple n-grams. The language likelihood scores within a section are combined for each language. The combined section scores are then summed together to obtain a total document score for each language. This results in a document score for each language, which can be ranked to determine the primary language for the document. The combination of languages in a document and the boundaries between them can also be identified by taking advantage of section breaking and classification. This also adds to an improved indexing system of multilingual documents.

BRIEF DESCRIPTION OF THE DRAWINGS

Illustrative embodiments of the invention are described in detail below, with reference to the attached drawing figures, which are incorporated by reference herein, and wherein:

FIG. 3 is a table illustrating different section weights used in accordance with embodiments of the invention;

FIG. 4 is a multilingual web search document used in accordance with embodiments of the invention;

FIG. 5 is a section breaking and classification table of a web search document used in accordance with embodiments of the invention;

FIG. 6 is an illustration of calculations used in accordance with embodiments of the invention;

FIG. 7 is an illustration of calculations used in accordance with embodiments of the invention;

DETAILED DESCRIPTION

Figure 1:
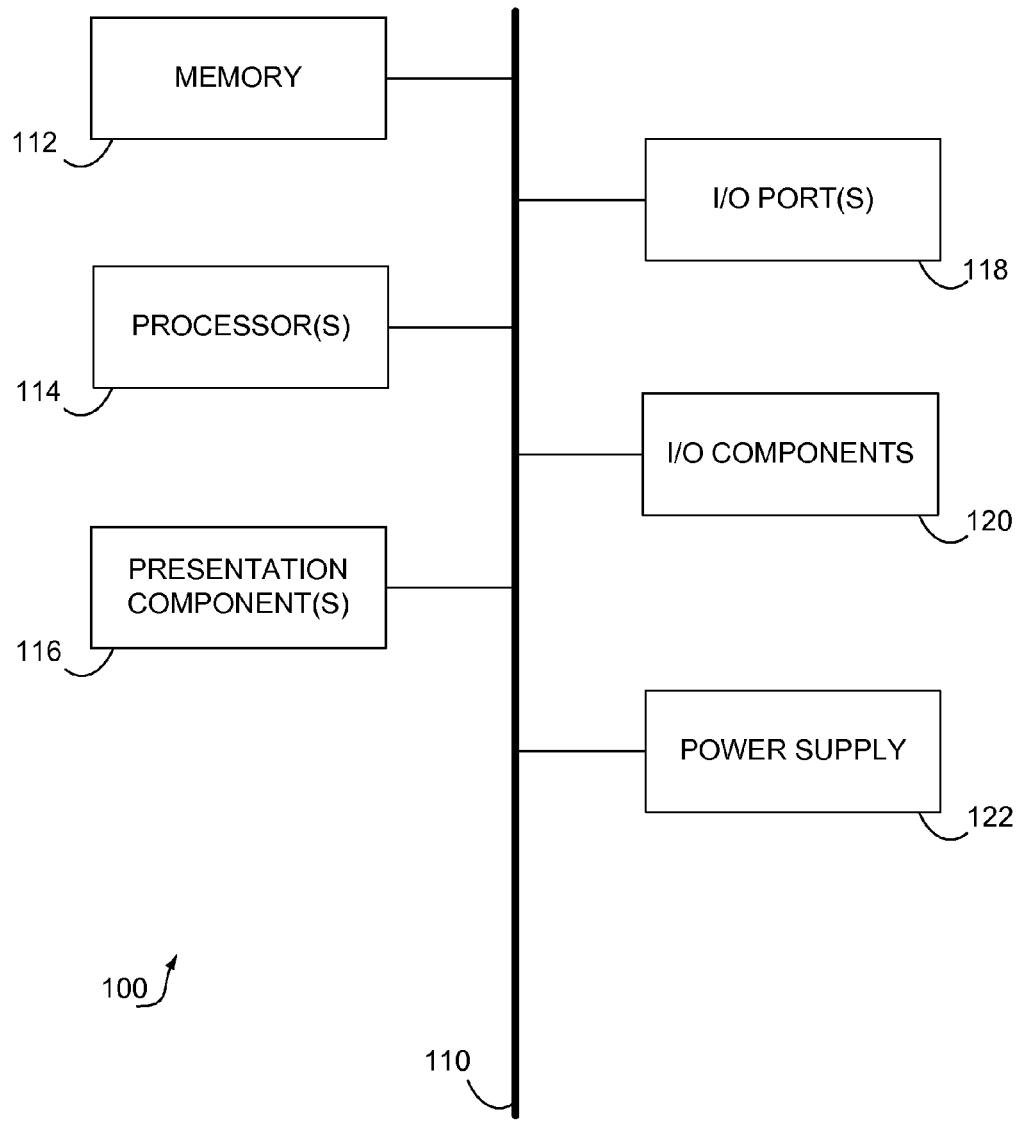
FIG. 1 is a block diagram illustrating an exemplary computer operating system used in accordance with embodiments of the invention.

Embodiments of the invention provide systems, methods and computer-readable storage media for identifying languages in a multilingual text document. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Embodiments of the invention include, without limitation, methods, systems, and sets of computer-executable instructions embodied on one or more computer-readable media. Computer-readable media include both volatile and nonvolatile media, removable and non-removable media, and media readable by a database and various other network devices. By way of example and not limitation, computer-readable storage media comprise media implemented in any method or technology for storing information. Examples of stored information include computer-useable instructions, data structures, program modules, and other data representations.

Media examples include, but are not limited to information-delivery media, random access memory (RAM), read-only memory (ROM), electrically erasable programmable read-only memory (EEPROM), flash memory or other memory technology, compact-disc read-only memory (CD-ROM), digital versatile discs (DVD), Blu-ray disc, holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network, such as the Internet.

In some embodiments, a computer-implemented system for identifying the languages of multilingual text in a document is described. The computer-implemented system comprises a code-page conversion component to identify the character encoding used by a document. The code-page conversion component also decodes the document into a universal representative encoding via the processor of a computing system. A section breaking and classification component divides plain-text content of the document into one or more weighted sections. A language scoring component obtains language likelihood scores of each word, phrase, or character n-gram in the one or more weighted sections. The language scoring component combines the obtained language likelihood scores according to language categories. An output language selection component selects a primary language for the document from the highest combined language likelihood scores. The output language selection component also determines the additional languages that are present in the document if needed.

In other embodiments, a computer-implemented method of identifying multilingual text in a document using a computing system is described. One or more regions of plain-text content in a document are isolated. The plain-text content is disjoined into sections according to semantic and syntactic categories. A weight is assigned to each of the sections. A language likelihood score is calculated for each word, phrase, or character n-gram in each of the sections. A combined language likelihood score is computed for each of the sections for each language. The highest ranked language from the computing is output as a primary language of the document. In another embodiment, one or more computer-readable storage media containing computer readable instructions embodied thereon that, when executed by a computing device, perform a method of identifying the languages of multilingual text in a document as described above.

In yet other embodiments, one or more computer-readable storage media containing computer-readable instructions embodied thereon that, when executed by a computing device, perform a method of selecting a primary language of a multilingual document is described. Plain-text content of a document is divided into one or more weighted script sections. A likelihood score is determined for each word, phrase, or character n-gram belonging to one or more languages for each of the weighted script sections. All of the likelihood scores from each word, phrase, or character n-gram in a section are summed together for each individual language. This results in one or more section language summations for each language. All of the section language summations are combined for each individual language, which results in a document score for each individual language. All of the document scores are ranked, and a primary document language is selected from the highest document score.

Having briefly described a general overview of the embodiments herein, an exemplary computing system is described below. Referring initially to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer or laptop). Embodiments of the invention are also applicable to a plurality of interconnected computing devices, such as computing devices 100 (e.g., wireless phone, personal digital assistant, or other handheld devices).

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which read data from various entities such as the memory 112 or the I/O components 120. The presentation components 116 present data indications to a user or other device. Exemplary presentation components 116 include display devices, speaker devices, printing devices, vibrating devices, and the like.

The I/O ports 118 logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. In embodiments, computing devices can also refer to devices which run applications of which images are captured by the camera in a wireless device.

The computing system described above is configured to be used with the several computer-implemented methods, systems, and media for identifying multilingual text in a document generally described above and described in more detail hereinafter.

Figure 2:
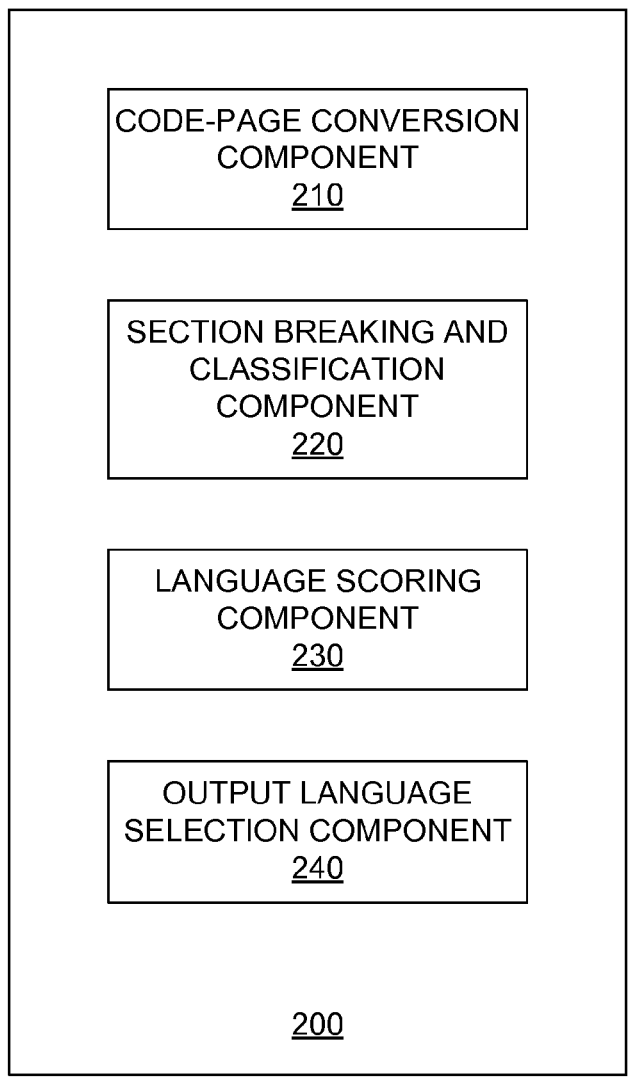
FIG. 2 is a block diagram illustrating a system for identifying multilingual text used in accordance with embodiments of the invention.

FIG. 2 is a block diagram illustrating a computer-implemented system for identifying the languages of multilingual text in a document, such as a web page in a search engine index. The search could be a World-Wide Web (WWW) search using an interconnected computing system, such as the Internet. However, embodiments of the invention are not limited to this example, and the embodiments contemplate utilizing other methods and systems for searching a document. The system 200 for identifying multilingual text in a document contains four computer-implemented components. A code-page conversion component 210 identifies the character encoding used by a document, such as a web page in a search engine index. The system decodes the original encoding of the document into a universal encoding. As an example for illustrative purposes only, an HTML document can be decoded into Unicode, such as UTF-8 representation. This provides a uniform encoding for a word or character in any language or script to be identified by a universal encoding. This decoding and encoding may be performed by using a processor of a computing system, such as the computing system described above with reference to FIG. 1. A section breaking and classification component 220 isolates plain-text content in a document and divides the plain-text content into one or more weighted sections. The division of plain-text content can be implemented by HTML parsing using HTML tags and punctuation, as an example. Different types of text and different classes of sections can be determined via HTML parsing. Various categories of each section can be determined based upon the associated HTML tags of the section, their attributes, and linguistic properties, such as its link density and sentence length. In addition to tags and punctuation, the actual text, visual appearance, and placement of the text within the document, such as the font size or a tree structure, help classify the section. An embodiment of the invention determines the x-y coordinates of each section within the displayed page to determine a header section (top of page) and a footer section (bottom of page) as examples. Other structured text can be recognized as a specific section, such as a copyright statement. Embodiments of the invention also provide for fine-grained section breaking Each section can also be divided into segments according to the script or writing system used within each section.

In addition to classifying a section, a particular weight is assigned to each section, based upon the importance of each section, relative to the entire document. For example, a title or certain textual headers are more important and provide more information about the document, as compared to other sections, such as a copyright or legal notice. Therefore, the language of the title should be given more weight than the language of the copyright statement, as an example, in determining the primary language to assign to a document. FIG. 3 is a table showing different weights that can be applied to particular sections. The resulting table in FIG. 3 is based on training and test sets which measure the classes that give the best results, i.e. a higher score. However, these are shown as exemplary section weights only. Other weights and weighting systems are contemplated within embodiments of the invention. When a document is broken into different sections for individual processing, each section also utilizes a weighting system to provide greater weight to more important sections of a document. Therefore, the section breaking and classification component 220 of FIG. 2 contains multiple tools to provide a better language designation of a document.

The section breaking and classification component 220 is illustrated using an example with reference to FIGS. 4 and 5. FIG. 4 is an example of a web search document which contains multiple scripts and languages. By using the section breaking and classification component 220 as described above, a result is obtained, such as that shown in FIG. 5. The single document of FIG. 4 has been divided into sections, as listed under the "Sections" heading shown in FIG. 5. Each section is then classified, such as header, left side bar, and main block, as listed under the "Classes" heading. Items such as links and drop-down lists are also considered as classified sections. In addition, each classified section has the script classification for the associated sections. The score under the "Weight" heading is a combined score for each classified section and its associated script.

The language scoring component 230 of FIG. 2 determines a list of possible languages each script segment (or script section, if the entire section comprises one script only) may correspond to and computes their corresponding scores. If a script segment corresponds to a single language, then the score of the language is computed based upon the script segment weight, a preset unit score, and the number of units the segment contains, as described hereinafter. The script segment weight is calculated by utilizing the section weight as described above with reference to FIG. 3, and also utilizing a language rating. An embodiment of the invention uses a Bayesian theory, which assumes a prior likelihood (before analyzing the document) of a specific document language. For example, English has a high score since a document is more likely to be English than some other language. The Bayesian prior determination is a function of a combination of factors, such as the popularity of the language on the web, the country that the document originated from, the code-page the document is encoded with (as described above with reference to the code conversion component 210), and the URL of the document. When one language only is present in a script segment, a pre-assigned language score is applied for the preset unit score. The number of units refers to the number of words for space-separated scripts and to the number of characters for scripts without space separation.

When a script segment possibly contains multiple languages, then a language score is computed by looking up the likelihood, such as the log-likelihood of each word, phrase, or character n-gram belonging to each language in a dictionary. The dictionary contains the log-likelihood of each word belonging to one or more languages. The log-likelihood scores are combined for each language to obtain a final score for each language within each segment or section.

FIG. 6 illustrates a procedure for obtaining a result from the language scoring component 230. For a first language, language$_1$, the log-likelihood scores, $S_{1k}$ for each word within section$_1$ are combined, then multiplied by its applicable section weight, $w_1$ to obtain a summation score for section$_1 = \Sigma S_{1k} w_1$ over the value of k. For language$_1$, the log-likelihood scores, $S_{1k}$ for each word within section are combined, then multiplied by its applicable section weight, $w_2$ to obtain a summation score for section$_2 = \Sigma_{1k} w_2$ over the value of k. For language$_1$, the log-likelihood scores, $S_{1k}$ for each word within any remaining section$_n$ are combined, then multiplied by its applicable section weight, $w_n$ to obtain a summation score for section$_n = \Sigma S_{1k} w_n$ over the value of k. The total document score for language$_1$, notated as $D_1$, is calculated by combining the summation scores for all of sections 1 through n, wherein $D_1 = \rho S_{1k} w_{1 \rightarrow n}$ over the value of k. The same process is conducted to determine a total document score, $D_j$ for any other language$_j$ that is present in the document.

FIG. 7 is a condensed calculation for determining the document score for a language$_j$. The calculation of FIG. 7 also takes into account other factors, such as a cut-off count, where only words with a score above the cut-off count are retained and the remaining scores which are less than the cut-off count are discarded.

All of the document scores, $D_1$ through $D_m$ are ranked in order of score value. With reference back to FIG. 2, an output language selection component 240 can now output the highest ranked language score as the primary language of the document. The output language selection component 240 can also assign a secondary, tertiary, etc. output language as well. In another embodiment, the output language selection component 240 further examines each lower ranked language in sequence to determine if it covers an alternative alphabet or script that is not already covered by the current language output. If so, then it can be appended to the output list as an alternative language. The output language selection component 240 determines the boundary of each output language and can aggregate the script segments that contributed to its score.

Figure 8:
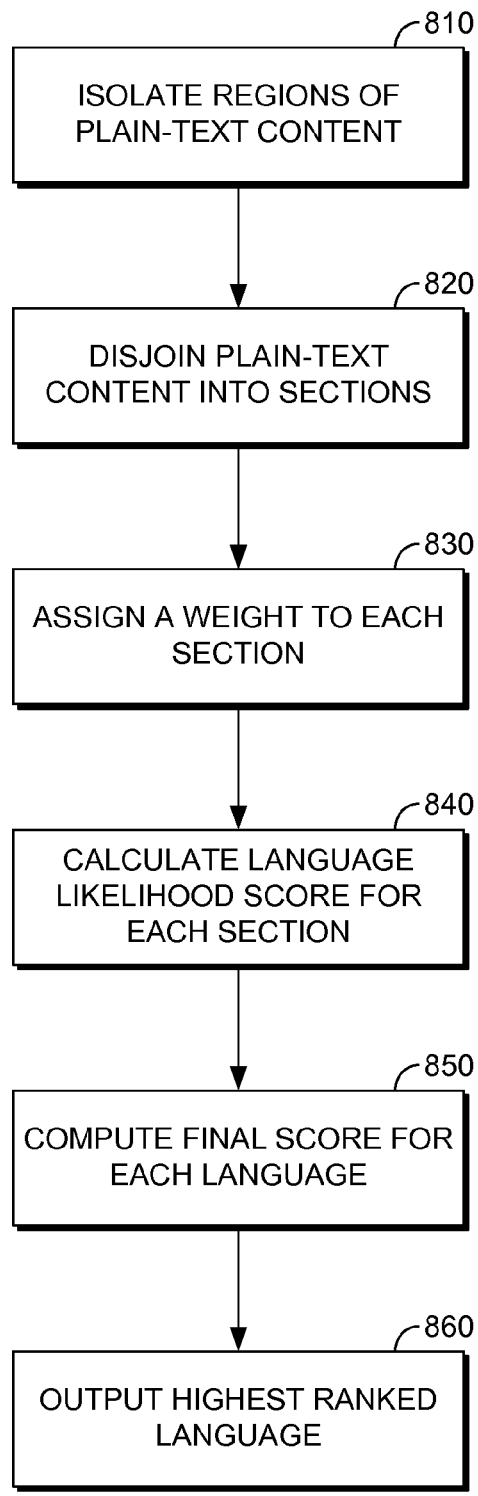
FIG. 8 is a flow diagram of a method of identifying multilingual text used in accordance with embodiments of the invention.

FIG. 8 is a flow diagram illustrating a computer-implemented method of identifying multilingual text in a document. Regions of a document containing plain-text content are isolated in step 810. The isolated plain-text content is disjoined into sections based on factors, such as HTML tags and punctuation in step 820. Syntactic and semantic categories of each section are determined based upon the associated tags, their attributes, and linguistic properties. Categories include, but are not limited to, anchor text, drop-down list, source code, copyright statement, and user comments. Each section is assigned an importance weight in step 830. Examples of various importance weights were discussed above with reference to FIG. 3. A language likelihood score is calculated for each section in step 840, and a final score is computed for each language in step 850. FIGS. 6 and 7 illustrate the calculations utilized in steps 830 and 840. After final likelihood scores are computed for each language within the document, the final likelihood scores are ranked according to score. The highest ranked score is output as the primary language for the document in step 860.

Figure 9:
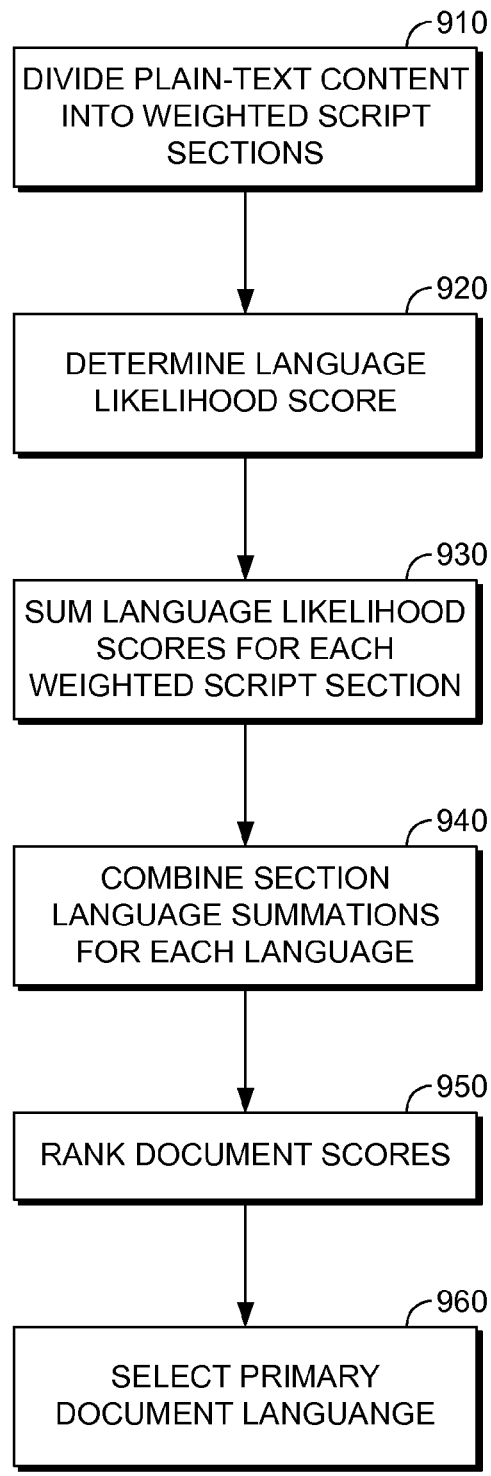
FIG. 9 is a flow diagram of a method of selecting a primary language used in accordance with embodiments of the invention.

FIG. 9 is a flow diagram illustrating one or more computer-readable storage media containing computer-readable instructions embodied thereon that, when executed by a computing device, perform a method of selecting a primary language of a multilingual document. The plain-text content is divided into weighted script sections in step 910. FIG. 4 illustrates an example of a multilingual document, and FIG. 5 illustrates how that multilingual document of FIG. 4 might be divided or classified. FIG. 5 has also been parsed into sections based on associated tags and punctuation, with each section being assigned a corresponding weight according to its importance within the document. FIG. 5 is just one example of breaking and classifying a multilingual document, and other embodiments are contemplated within the invention. A likelihood score is determined for each word, phrase, or character n-gram within each of the weighted script sections in step 920. A special word-breaker is utilized to enable locating the individual words, phrases, or character n-grams in a multiple language dictionary. An embodiment of the invention utilizes a log-likelihood of multiple language dictionary scores of each word, phrase, or character n-gram. Certain scripts or writing systems, such as Latin are word based, wherein words are separated by spacing. Other scripts, such as Chinese are character based, since there is no spacing between words. A likelihood score for each language within each weighted script section is determined in step 930. The individual likelihood scores obtained from the multiple language dictionary are combined together and multiplied by its respective section weight value. As illustrated in FIG. 6, the combined individual likelihood scores are calculated for each language within each weighted script section. The combined individual likelihood scores for each section are summed together to provide a language summation score for each language in the document in step 940. This is illustrated in FIG. 6 by the $D_j$ scores. These document scores are ranked in step 950, such as ranking the scores in a highest to lowest score value for each language. The primary document language can then be selected in step 960 as the highest document ranking score. Since all of the document scores are ranked in order of score value, another embodiment also provides for determining a secondary and tertiary ranked language as well.

After the languages have been determined for each section, a language-appropriate word-breaker is assigned, based upon the language of each section. A more accurate analysis of languages present in a document is made using embodiments of the invention. As a result, a more accurate selection of the relevant word-breakers is also made. An embodiment of the invention comprises a highly accurate index for text written in different languages in a multilingual document, using methods, systems, and media described herein.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented system for identifying multilingual text in a document using computer processor, memory, and data storage subsystems, the computer-implemented system comprising:

a code-page conversion component to identify the character encoding used by a document and to decode said encoding into a universal representative encoding via the processor;

a section breaking and classification component to divide plain-text content of the document into one or more weighted sections, the sections are weighed according to their relative importance in conveying information regarding a content of the document and comprise logical areas of a layout of the document including one or more of title, heading, article text, header, and footer;

a language scoring component to calculate a document score for each language present in the document by:
 (1) obtaining a language likelihood scores of each word, phrase, or character n-gram in the one or more weighted sections, to
 (2) generating a sum of the obtained language likelihood scores within the one or more weighted sections for each language present,
 (3) for each section, generating a summation score for each language evaluated by multiplying each language's likelihood score sum by a weight associated with the section, and
 (4) calculating the document score by summing the summation scores within the document; and an output language selection component to select a primary language for the document, wherein the primary language has the highest document score.

2. The computer-implemented system of claim 1, wherein the universal representative coding comprises Unicode.

3. The computer-implemented system of claim 1, wherein the one or more weighted sections comprise a title with a higher weight than a footer.

4. The computer-implemented system of claim 1, wherein the plain-text content is parsed into sections based upon HTML tags, visual layout, structure, and semantic content of the document.

5. The computer-implemented system of claim 1, wherein the language likelihood score comprises a likelihood of each word, phrase, or character n-gram belonging to one or more languages.

6. The computer-implemented system of claim 1, wherein the output language selection component ranks results of the combined language likelihood scores for each language.

7. A computer-implemented method of identifying multilingual text in a document using a computing system having processor, memory, and data storage subsystems, the computer-implemented method comprising:

isolating one or more regions of plain-text content in a document;

disjoining the plain-text content into sections according to semantic and syntactic categories, the sections comprise logical areas of a layout of the document including one or more of title, heading, article text, header, and footer;

assigning a weight to each of the sections according to relative importance in conveying information regarding a content of the document;

calculating a language likelihood score for each word, phrase, or character n-gram in each of the sections;

computing a combined language likelihood score for each of the sections for each language by summing the language likelihood scores for each word, phrase, or character n-gram in each of the sections and multiplying by the weight assigned to the section;

computing a document score for each language by summing the language likelihood scores of the document for each language; and outputting a language having a highest ranked document score as a primary language of the document.

8. The computer-implemented method of claim 7, further comprising:
identifying an encoding used with the document; and
decoding into a universal representative code.

9. The computer-implemented method of claim 7, wherein said calculating comprises:
calculating the language likelihood scores for each word, phrase, or character n-gram within a section multiplied by a weight of the associated section.

10. The computer-implemented method of claim 7, further comprising: dividing each of the sections of plain-text content into segments according to a writing script used.

11. The computer-implemented method of claim 10, wherein the assigning comprises: assigning a weight to each of the segments.

12. One or more computer-readable storage device containing computer-readable instructions embodied thereon that, when executed by a computing device, perform a method of selecting a primary language of a multilingual document, the method comprising:

dividing plain-text content of a document into one or more weighted sections, the sections are weighed according to their relative importance in conveying information regarding a content of the document and comprise logical areas of a layout of the document including one or more of title, heading, article text, header, and footer;

determining a likelihood score for each word, phrase, or character n-gram belonging to one or more languages for each of the weighted sections;

summing all of the likelihood scores from each word, phrase, or character n-gram in each of the sections and multiplying a sum by the weight associated with the section for each individual language to obtain one or more section language summations;

combining all of the section language summations for each individual language to obtain a document score for each individual language;

ranking all of the document scores; and selecting a primary document language from the highest document score.

13. The device of claim 12, further comprising:
converting an encoding of the document into a universal representative coding.

14. The device of claim 12, wherein the dividing is implemented using HTML tags.

15. The device of claim 12, wherein the likelihood scores for each word, phrase, or character n-gram is obtained from a dictionary via a word-breaker.

16. The device of claim 12, further comprising:
dividing each of the one or more weighted sections into one or more weighted language sections.

17. The device of claim 12, further comprising:
selecting additional languages that cover alternative alphabets or scripts that are not already covered by the primary language output.

18. The device of claim 12, wherein the one or more weighted sections are based upon importance of each section and a popularity of each language.

* * * * *